United States Patent [19]

Burba, III

[11] 4,348,295
[45] Sep. 7, 1982

[54] CRYSTALLINE LITHIUM ALUMINATES

[75] Inventor: John L. Burba, III, Lake Jackson, Tex.

[73] Assignee: The Dow Chemical Company, Midland, Mich.

[21] Appl. No.: 217,614

[22] Filed: Dec. 18, 1980

[51] Int. Cl.³ .................... B01D 15/04; C01D 15/00
[52] U.S. Cl. ........................................ 252/184; 55/67; 55/386; 210/663; 423/179.5; 423/181; 521/28
[58] Field of Search .................... 252/184; 55/67, 386; 210/198.2, 663; 423/179.5, 181; 521/28

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,159,311 | 6/1979 | Lee et al. | 423/181 |
| 4,221,767 | 9/1980 | Lee et al. | 423/179.5 |
| 4,284,727 | 8/1981 | Boros et al. | 521/28 |

*Primary Examiner*—Irwin Gluck
*Attorney, Agent, or Firm*—W. J. Lee

[57] ABSTRACT

Crystalline hydrous aluminas, $Al(OH)_3$, are reacted with LiX, where X is anion, under appropriate conditions to prepare crystalline compounds conforming substantially to the empirical formula $$LiX.2Al(OH)_3.nH_2O$$

where X is anion and $nH_2O$ represents waters of hydration. Depending on the beginning hydrous alumina, some of the crystalline compounds are of a novel 2-layer unit cell structure and some of a 3-layer unit cell structure.

14 Claims, No Drawings

CRYSTALLINE LITHIUM ALUMINATES

BACKGROUND OF THE INVENTION

It is known, e.g., from U.S. Pat. Nos. 4,116,858 and 4,159,311, that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX.2Al(OH)_3$ which is useful in selectively recovering $Li^+$ values from aqueous solutions, e.g., Li-containing brines.

It is also known, e.g., from U.S. Pat. No. 4,116,856 and U.S. Pat. No. 4,221,767, that improvements in the above discussed formation of crystalline $LiX.2Al(OH)_3$ are found by reacting amorphous $Al(OH)_3$, or crystalline hydrous alumina (e.g., norstrandite, bayerite, gibbsite or mixtures of these) with LiOH to form $LiOH.2Al(OH)_3.nH_2O$ which is then reacted with LiX to form the crystalline $LiX.2Al(OH)_3$, where X is halide.

The present invention is believed to be most closely related to the above-identified patents and the patents are incorporated by reference in their entirety here. The teachings in U.S. Pat. No. 4,116,856 are particularly relevant where it discloses that crystalline hydrous alumina (e.g., norstrandite and/or bayerite) dispersed in ion exchange resin is not converted back to its original $LiX.2Al(OH)_3.nH_2O$ form by treatment with LiX unless the hydrous alumina is first, or simultaneously, reacted with LiOH. It has been unexpectedly found, in accordance with the instant disclosure, that crystalline hydrous aluminas can be reacted directly with lithium salts to form crystalline lithium salt aluminates if the correct ranges of temperature and concentration are employed.

SUMMARY OF THE INVENTION

Lithium aluminates are prepared under appropriate conditions by reacting lithium salts with crystalline hydrous aluminas and the resulting crystals are of the 2-layer or 3-layer variety. The lithium aluminates may be prepared neat (unsupported) or supported on, or in, a substrate.

DESCRIPTION OF THE INVENTION

Crystalline hydrous aluminas are reacted with lithium salts under the influence of elevated temperature and sufficient concentration to form lithium aluminates, designated here as $LiX.2Al(OH)_3.nH_2O$ where X is an anion characterized as an anion which will form acids when in molecular combination with hydrogen or will form salts when in molecular combination with metal ions. It will be understood, of course, that the lithium aluminates will normally contain some waters of hydration, designated as $nH_2O$ in the above formula. The anion may have a valence of 1, 2, or 3.

When the beginning hydrous alumina is amorphous, such as when freshly prepared by ammonia precipitation of $Al(OH)_3$ from an $AlCl_3$ solution, the reaction to form lithium aluminates may be done using relatively weak solutions of the lithium salt (up to about 10%) and at relatively low temperatures (e.g., 20° C.–40° C.), then when heated at, e.g., about 50° C. or higher, the lithium aluminate becomes crystallized.

However, when the beginning hydrous alumina is crystalline (such as bayerite, gibbsite, norstrandite, or boehmite), then the relatively low temperature treatment with lithium salt does not appear to form an appreciable amount (if any) of lithium aluminate within a reasonable length of time.

It has now been found, surprisingly, that when heated at elevated temperature of preferably about 85° C.–120° C., the mixture of crystalline hydrous alumina and lithium salt forms lithium aluminate. Along with this higher temperature, it is necessary that the lithium salt solution be of a relatively high concentration, preferably above about 12%, most preferably above about 20% or may be at the saturation limit of the lithium salt, especially if it is only slightly soluble. The combination of high temperature and high concentration is particularly effective in forcing the lithium salt into the layers of the hydrous alumina crystals, which in some cases gives a crystallographic unit cell having two layers of lithium salt and two layers of hydrous alumina and in other cases gives a crystallographic unit cell having three layers of lithium salt and three layers of hydrous alumina.

The lithium aluminates discussed here have two crystal structures, viz those of 2-layer crystallographic unit cells and those of 3-layer crystallographic unit cells. The 3-layer lithium aluminates have a 3-fold screw axis oriented parallel to the c-axis of the lithium aluminate crystal. The 2-layer lithium aluminates have a 2-fold axis of rotation oriented parallel to the c-axis, as determined by the x-ray crystal studies.

For purposes of discussion and description in this disclosure, two-layer lithium aluminates and three-layer lithium aluminates are graphically illustrated as follows:

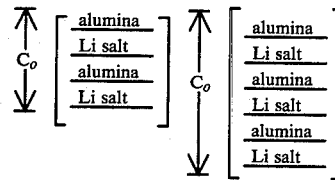

The heating of the mixture of lithium salt and hydrous alumina crystals may be performed in an open vessel, in a closed vessel, or at reflux. If performed in an open vessel where water vapor can escape, or if reduced pressure is applied to remove water vapor, the resulting increase in concentration of the lithium salt is beneficial in that the higher concentration tends to help drive the lithium salt into the alumina layers.

In those instances wherein water vapor is allowed to escape, a low concentration (generally less than about 10%) lithium salt may be employed at the outset, then the increase in concentration which results from water loss can be sufficient to drive the lithium salt into the hydrous alumina.

The preferred lower ratio of lithium salt to hydrous alumina, $Al(OH)_3$, in the mixture is about 0.5 moles of Li to 1 mole of Al. The upper limit of Li to Al is the saturation point of the lithium salt solution.

The lithium salts for reaction with the hydrous alumina can be at least one of the group exemplified by LiCl, LiBr, LiI, $LiNO_3$, $LiClO_4$, LiClO, LiSCN, LiOOCH, $LiC_2H_3O_2$, and the like. Stated another way the X in LiX may be any anion of a halo acid (excluding F), a mineral acid or inorganic acid, or an organic acid which is stable under reaction conditions. Virtually any water soluble lithium salt would be expected to be within the purview of this invention so long as the anion is not so large as to preclude entering the interstices of the alumina crystal.

The 2-layer variety of lithium aluminate is a novel composition and is prepared by reaction of lithium salt with gibbsite. Reaction of lithium salt with other forms of hydrous alumina, such as bayerite or norstrandite, produces 3-layer lithium aluminates. It is not possible to convert 2-layer lithium aluminate to 3-layer lithium aluminate without completely solubilizing the lithium aluminate to re-precipitate it as 3-layer.

The 2-layer $LiCl.2Al(OH)_3.nH_2O$, whether in neat form or supported on or within a substrate, exhibits different behavior in $H_2O$ than does the 3-layer variety. When reacted with $H_2O$ the 2-layer $LiCl.2Al(OH)_3.nH_2O$ decomposes to LiCl and gibbsite with the equilibrium LiCl concentration of about 0.14 moles of $Li^+$ per liter of solution, whereas 3-layer $LiCl.2Al(OH)_3.nH_2O$ is stable in $H_2O$ if there is as much as about 50 ppm $Li^+$ in the solution.

The 2-layer $LiX.2Al(OH)_3.nH_2O$ can be reacted with LiOH to form 2-layer $LiOH.2Al(OH)_3.nH_2O$; this can then be neutralized with an acid to form 2-layer lithium aluminate containing anions of the acid. Likewise 3-layer $LiOH.2Al(OH)_3.nH_2O$ can be neutralized with an acid to form 3-layer lithium aluminate containing anions of the acid.

The examples which follow are to illustrate particular embodiments; the invention is not limited to the particular embodiments illustrated, but is limited only by the claims.

EXAMPLE 1

A 50-gram portion of gibbsite is reacted with 200 ml of 20% LiCl solution at 115° C. for about 2 hours. The product obtained is 2-layer $LiCl.2Al(OH)_3.nH_2O$ as determined by x-ray diffraction data.

EXAMPLE 2

A 200-ml portion of a macroporous ion exchange resin in bead form (DOWEX MWA-1, a Trademark of The Dow Chemical Company) containing gibbsite within its pores is reacted with about 500 ml of 20% LiCl solution at about 105° C. under reflux for about 2-3 hours. The reaction product obtained is 2-layer $LiCl.2Al(OH)_3.nH_2O$ as determined by x-ray diffraction data.

EXAMPLE 3

A 200-ml portion of the same resin as in Example 2 above, but containing bayerite within its pores, is reacted with about 500 ml of 20% LiCl solution at about 105° C. under reflux for about 2-3 hours. The reaction product obtained is 3-layer $LiCl.2Al(OH)_3.nH_2O$ as determined by x-ray diffraction data.

EXAMPLE 4

About 200 ml of the same resin as above, but containing norstrandite within its pores, is refluxed with about 500 ml of 20% LiCl solution for about 2-3 hours. The reaction product obtained is 3-layer $LiCl.2Al(OH)_3.nH_2O$ as determined by x-ray diffraction data.

EXAMPLE 5

About 10 grams of 2-layer $LiCl.2Al(OH)_3.nH_2O$ is repeatedly washed with 1% LiOH solution at room temperature until no $Cl^-$ is detected in the filtrate by $AgNO_3$ test. Analysis data from x-ray diffraction shows the material is 2-layer $LiOH.2Al(OH)_3.nH_2O$.

The 2-layer $LiOH.2Al(OH)_3.nH_2O$ is titrated with $CH_2CHCO_2H$, acrylic acid, to a pH of 5. X-ray diffraction data shows 2-layer $Li(CH_2CHCO_2).2Al(OH)_3.nH_2O$.

Compounds made in accordance with the present invention are useful in selectively removing $Li^+$ values from aqueous solution and are also useful in exchanging of the anion (X) with other anions in aqueous solution.

I claim:

1. A process whereby crystalline hydrous alumina is converted to crystalline $LiX.2Al(OH)_3.nH_2O$, where $nH_2O$ indicates waters of hydration, and
where X indicates anions which will form acids when in molecular combination with hydrogen or will form salts when in molecular combination with metal ions,
said process comprising reacting the said alumina with a concentrated solution of LiX at an elevated temperature of at least about 85° C.

2. The process of claim 1 wherein the alumina is not supported on, or within, a solid substrate.

3. The process of claim 1 wherein the alumina is supported on, or within, a solid substrate.

4. The process of claim 1 wherein the alumina is within the pores of a porous substrate.

5. The process of claim 1 wherein the hydrous alumina is within the pores of a macroporous ion exchange resin.

6. The process of claim 1 wherein the $LiX.2Al(OH)_3.nH_2O$ is converted to $LiOH.2Al(OH)_3.nH_2O$ by reaction with LiOH.

7. The process of claim 1 wherein the alumina is gibbsite and the $LiX.2Al(OH)_3.nH_2O$ reaction product is of the 2-layer unit cell variety.

8. The process of claim 1 wherein the alumina is bayerite, or nostrandite, and the $LiX.2Al(OH)_3.nH_2O$ reaction product is of the 3-layer unit cell variety.

9. A composition of matter comprising crystalline $LiX.2Al(OH)_3.nH_2O$, where $nH_2O$ represents waters of hydration, X indicates anions which will form acids when in molecular combination with hydrogen or will form salts when in molecular combination with metal ions, said crystalline composition being of the 2-layer unit cell variety.

10. A composition of matter comprising crystalline $LiOH.2Al(OH)_3nH_2O$, where $nH_2O$ represents waters of hydration, said crystalline composition being of the 2-layer unit cell variety.

11. The composition of claim 9 or 10 when not supported on, or within, a solid substrate.

12. The composition of claim 9 or 10 when supported on, or within, a solid substrate.

13. The composition of claim 9 or 10 when supported within the pores of a porous substrate.

14. The composition of claim 9 or 10 when supported within the pores of a macroporous ion exchange resin.

* * * * *